United States Patent
Wohlfeld et al.

(10) Patent No.: US 12,412,288 B2
(45) Date of Patent: Sep. 9, 2025

(54) ALIGNING SCANS OF AN ENVIRONMENT USING A REFERENCE OBJECT

(71) Applicant: FARO Technologies, Inc., Lake Mary, FL (US)

(72) Inventors: Denis Wohlfeld, Ludwigsburg (DE); Tobias Boehret, Aidlingen (DE)

(73) Assignee: FARO Technologies, Inc., Lake Mary, FL (US)

( * ) Notice: Subject to any disclaimer, the term of this patent is extended or adjusted under 35 U.S.C. 154(b) by 289 days.

(21) Appl. No.: 18/109,977

(22) Filed: Feb. 15, 2023

(65) Prior Publication Data

US 2023/0267626 A1 Aug. 24, 2023

Related U.S. Application Data

(60) Provisional application No. 63/311,685, filed on Feb. 18, 2022.

(51) Int. Cl.
*G06T 7/33* (2017.01)
*G01C 15/00* (2006.01)

(52) U.S. Cl.
CPC ............ *G06T 7/337* (2017.01); *G01C 15/004* (2013.01); *G06T 2207/10028* (2013.01); *G06T 2207/10032* (2013.01); *G06T 2207/20221* (2013.01)

(58) Field of Classification Search
None
See application file for complete search history.

(56) References Cited

U.S. PATENT DOCUMENTS

| 10,565,787 | B1 * | 2/2020 | Jordan | G06T 7/97 |
| 12,081,909 | B2 * | 9/2024 | Terry | H04N 23/661 |
| 2018/0308254 | A1 * | 10/2018 | Fu | G06V 20/64 |
| 2020/0284574 | A1 | 9/2020 | Döring et al. | |
| 2021/0374978 | A1 | 12/2021 | Döring et al. | |
| 2023/0334809 | A1 * | 10/2023 | Aoki | G01S 17/86 |

FOREIGN PATENT DOCUMENTS

DE 102009035336 B3 11/2010

OTHER PUBLICATIONS

European Office Action for Application No. 23157307.2, dated Jun. 27, 2023, 11 pages.

* cited by examiner

*Primary Examiner* — Nurun Flora
(74) *Attorney, Agent, or Firm* — McCarter & English, LLP; Dave S. Christensen

(57) ABSTRACT

An example method includes receiving a first plurality of coordinate measurement points capturing a portion of an environment and a reference object within the environment, the first plurality of coordinate measurement points defining at least a portion of a first point cloud. The method further includes receiving a second plurality of coordinate measurement points from a position other than the at least one aerial position, the second plurality of coordinate measurement points capturing at least some of the portion of the environment and the reference object within the environment, the second plurality of coordinate measurement points defining at least a portion of a second point cloud. The method further includes aligning the first point cloud and the second point cloud based at least in part on the reference object captured in the first point cloud and the reference object captured the second point cloud to generate a combined point cloud.

18 Claims, 18 Drawing Sheets

ALIGNING SCANS OF AN ENVIRONMENT USING A REFERENCE OBJECT

CROSS-REFERENCE TO RELATED APPLICATIONS

The present application is a nonprovisional application of, and claims the benefit of, U.S. Provisional Application Ser. No. 63/311,685 filed on Feb. 28, 2022 entitled Aligning Scans Of An Environment Using A Reference Object, the contents of which is incorporated by reference.

BACKGROUND

The present application relates generally to scanning environments, and more specifically to the aligning scans of an environment using a reference object.

The subject matter disclosed herein relates to the use of a three-dimensional (3D) scanner, such as a time-of-flight (TOF) coordinate measurement device, a triangulation measurement device, a structured light measurement device, or an area coordinate measurement device. A 3D scanner of this type directs light (i.e. a beam of light or a pattern of light) to a non-cooperative target such as a diffusely scattering surface of an object. In the case of a TOF coordinate measurement device a distance to the object is measured, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected and stored as a point cloud.

A triangulation, structured light, or area scanner is a scanner in which the distance to the target is based on triangulation between a projected pattern of light and an image of the pattern of light on the surface. In some instances, the determination of the distance to the object is based on epipoloar geometry.

While existing coordinate measurement devices or scanners are suitable for their intended purposes the need for improvement remains, particularly in providing a method and system of registering together coordinate or point cloud data acquired by different measurement devices.

BRIEF DESCRIPTION

According to an embodiment, a method is provided. The method includes receiving, from a first three-dimensional scanner that acquires a first plurality of coordinate measurement points from at least one aerial position, the first plurality of coordinate measurement points capturing a portion of an environment and a reference object within the environment, the first plurality of coordinate measurement points defining at least a portion of a first point cloud. The method further includes receiving, from a second three-dimensional scanner, a second plurality of coordinate measurement points from a position other than the at least one aerial position, the second plurality of coordinate measurement points capturing at least some of the portion of the environment and the reference object within the environment, the second plurality of coordinate measurement points defining at least a portion of a second point cloud. The method further includes aligning, by the processing device, the first point cloud and the second point cloud based at least in part on the reference object captured in the first point cloud and the reference object captured the second point cloud to generate a combined point cloud.

In addition to one or more of the features described herein, or as an alternative, further embodiments of the method may include that the reference object has a defined geometry.

In addition to one or more of the features described herein, or as an alternative, further embodiments of the method may include that the reference object has a parallelepiped shape.

In addition to one or more of the features described herein, or as an alternative, further embodiments of the method may include that the cuboid includes an indicium on a surface of the parallelepiped shape.

In addition to one or more of the features described herein, or as an alternative, further embodiments of the method may include that the parallelepiped shape is a cuboid that includes a first indicium on a side surface of the cuboid and a second indicium on a top surface of the cuboid.

In addition to one or more of the features described herein, or as an alternative, further embodiments of the method may include that the reference object is inflatable.

In addition to one or more of the features described herein, or as an alternative, further embodiments of the method may include that the reference object is foldable.

In addition to one or more of the features described herein, or as an alternative, further embodiments of the method may include that the reference object includes an indicium on a surface of the object.

In addition to one or more of the features described herein, or as an alternative, further embodiments of the method may include that the indicium is reflective.

In addition to one or more of the features described herein, or as an alternative, further embodiments of the method may include that the first image has a first time stamp associated therewith.

In addition to one or more of the features described herein, or as an alternative, further embodiments of the method may include that the second point cloud has a second time stamp associated therewith.

In addition to one or more of the features described herein, or as an alternative, further embodiments of the method may include that a surface of the reference object includes a unique identifier.

In addition to one or more of the features described herein, or as an alternative, further embodiments of the method may include that the reference object is two-dimensional.

In addition to one or more of the features described herein, or as an alternative, further embodiments of the method may include that the reference object is three-dimensional.

According to another embodiment, a method is provided. The method includes defining multiple reference objects throughout an environment to be scanned. The method further includes performing a first scan of the environment beginning at one of the multiple reference objects. The first scan includes capturing, along a first path, a first plurality of coordinate points of the environment including the multiple reference objects, the first plurality of coordinate points defining at least a portion of a first point cloud. The first scan further includes uploading the first point cloud to a cloud computing environment. The method further includes performing a second scan of the environment. The second scan includes capturing, along a second path, a second plurality of coordinate points of the environment including the multiple reference objects, the second plurality of coordinate points forming at least a portion of a second point cloud. The second scan further includes uploading the second point cloud to the cloud computing environment. The method further includes aligning, at the cloud computing environment, the first point cloud and the second point cloud based at least in part on the multiple reference objects captured in the first point cloud and the multiple reference objects captured the second point cloud to generate a combined point cloud.

In addition to one or more of the features described herein, or as an alternative, further embodiments of the method may include that a surface of each of the multiple reference objects includes a unique identifier that uniquely identifies an associated one of the multiple reference objects.

In addition to one or more of the features described herein, or as an alternative, further embodiments of the method may include that each of the multiple reference objects has a defined geometry that is the same.

In addition to one or more of the features described herein, or as an alternative, further embodiments of the method may include that at least one of the multiple reference objects is inflatable.

In addition to one or more of the features described herein, or as an alternative, further embodiments of the method may include that at least one of the multiple reference objects is foldable.

According to another embodiment, a method is provided. The method includes defining multiple reference objects throughout an environment to be scanned. The method further includes performing a first scan of the environment beginning at one of the multiple reference objects. The first scan includes capturing, along a first path, first scan data of the environment including the multiple reference objects. The first scan further includes uploading the first scan data to a processing system. The method further includes performing a second scan of the environment. The second scan includes capturing, along a second path, second scan data of the environment including the multiple reference objects. The second scan further includes uploading the second scan data to the processing system. The method further includes aligning, by the processing system, the first scan data and the second scan data based at least in part on the multiple reference objects captured in the first scan data and the multiple reference objects captured the second scan data to generate a combined dataset.

In addition to one or more of the features described herein, or as an alternative, further embodiments of the method may include that the first scan is performed by a first scanner associated with a drone configured to follow the first path, and wherein the second scan is performed by a second scanner associated with a mobile base configured to follow the second path.

In addition to one or more of the features described herein, or as an alternative, further embodiments of the method may include that the first scan is performed by an aerial scanner and wherein the second scan is performed by a terrestrial scanner.

Other embodiments of the present invention implement the features of the above described systems in systems and in computer program products.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

One or more embodiments described herein relate to aligning scans of an environment using a reference object.

Figure 1:
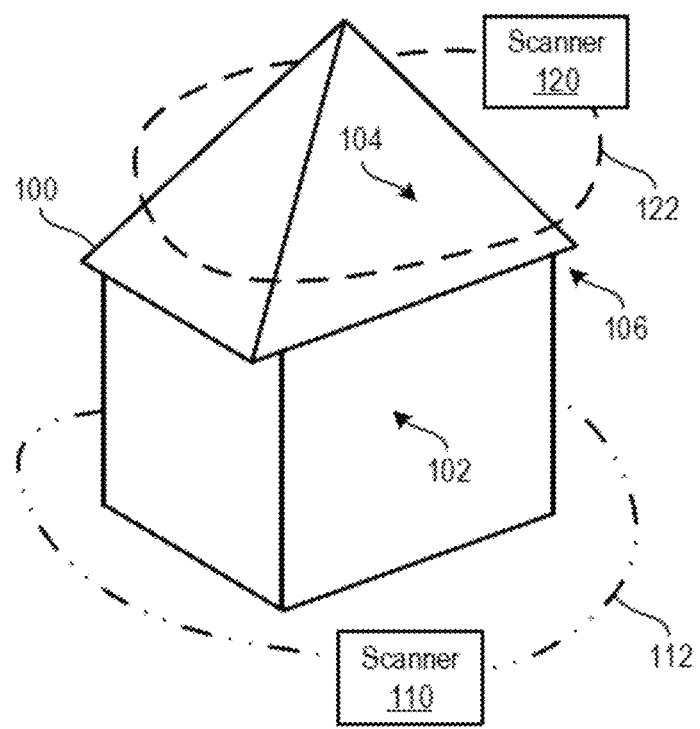
FIG. 1 depicts a structure to be scanned according to one or more embodiments described herein.

FIG. 1 depicts a structure 100 to be scanned. The structure 100 can be any configuration or arrangement and is merely shown here as an example. The structure 100 includes walls 102, a roof 104, and a soffit 106. A scanner, such as one or more of the scanner 110 and/or the scanner 120 can be used to perform a scan of the structure 100. It should be appreciated that while embodiments herein refer to a 3D coordinate measurement device as a laser scanner (e.g., the scanners 110 and/or 120), this is for example purposes and the claims should not be so limited. In other embodiments, other types of optical measurement devices may be used, such as but not limited to triangulation scanners and structured light scanners for example.

Traditional ground-based (terrestrial) laser scanners may not adequately capture certain features of the structure 100

(e.g., the roof 104, a balcony (not shown), a terrace (not shown), etc.). For example, the scanner 110 scanning along a path 112 may capture the walls 102 and soffit 106 but may not capture the roof 104 (or may only partially capture the roof 104).

Similarly, an aerial scanner (e.g., a scanner associated with a drone or other aerial/flying device) may not adequately capture other features of the structure 100 (e.g., portions of the walls 102, the soffit 106, facades (not shown), eaves (not shown), etc.). For example, the scanner 120 scanning along a path 122 may capture the roof 104 and may partially capture the walls 102, but may not fully capture the walls 102 or capture the soffit 106.

Figure 2A:
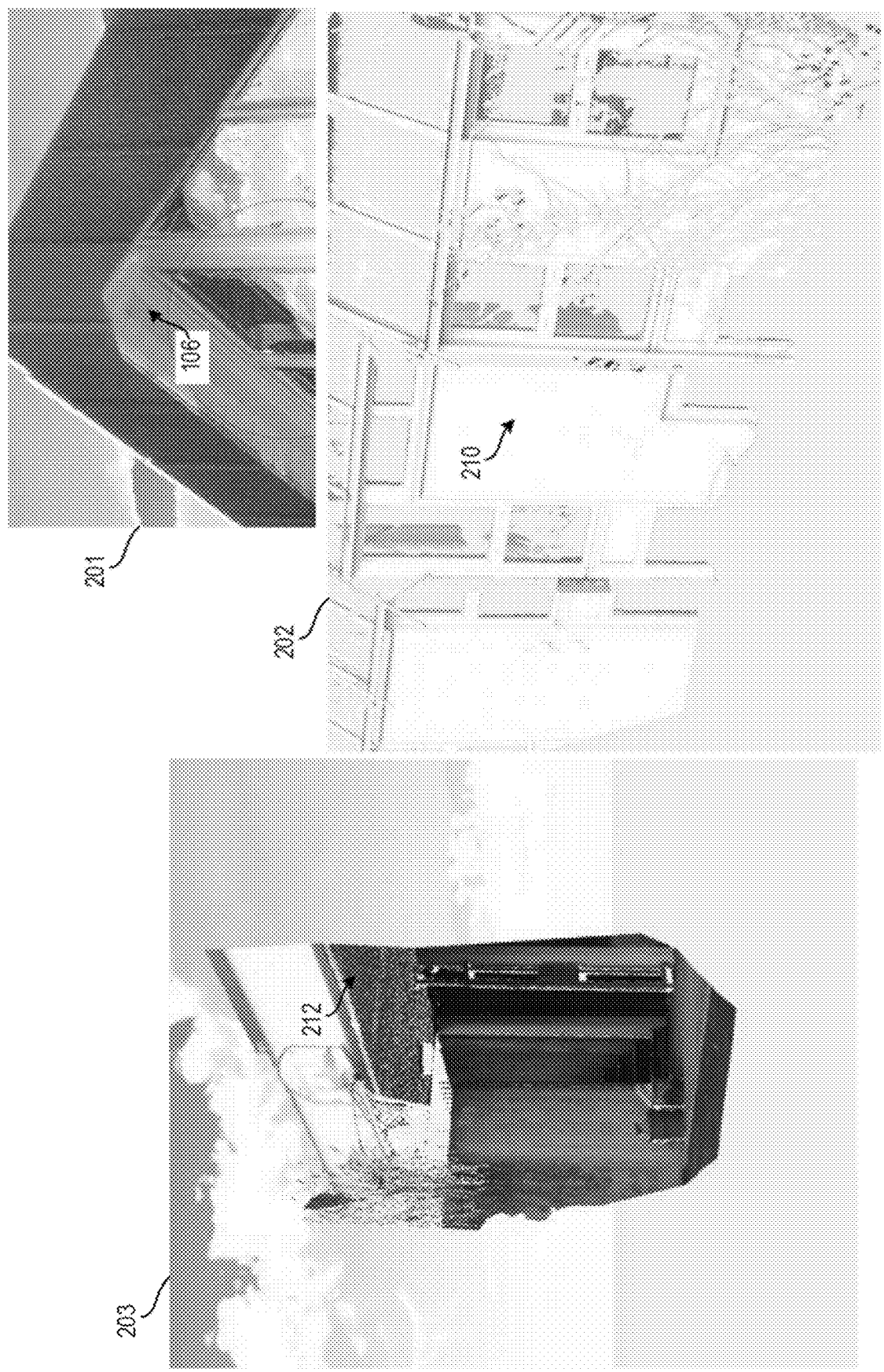
FIGS. 2A, 2B, 3A, and 3B illustrate portions of point-cloud/coordinate-data from the scanners of FIG. 1 according to one or more embodiments described herein.
Figure 2B:

FIGS. 2A, 2B, 3A, and 3B illustrate portions of scans from the scanners 110, 120. Particularly, FIGS. 2A and 2B illustrate portions 201, 202, 203, 204 of scans from the scanner 110, which in this example is a ground-based (terrestrial) laser scanner scanning along the path 112. As shown in FIG. 2A, the portion 201 has many data points on the soffit 106, the portion 202 has many data points on the façade 210, and the portion 203 has a desired data coverage (e.g. point density) on undercuts 212. As shown in FIG. 2B, the portion 204 has low point density on the roof 104, no (or very few) data points on the balcony 220, and no (or very few) data points on the terrace 222.

Figure 3A:
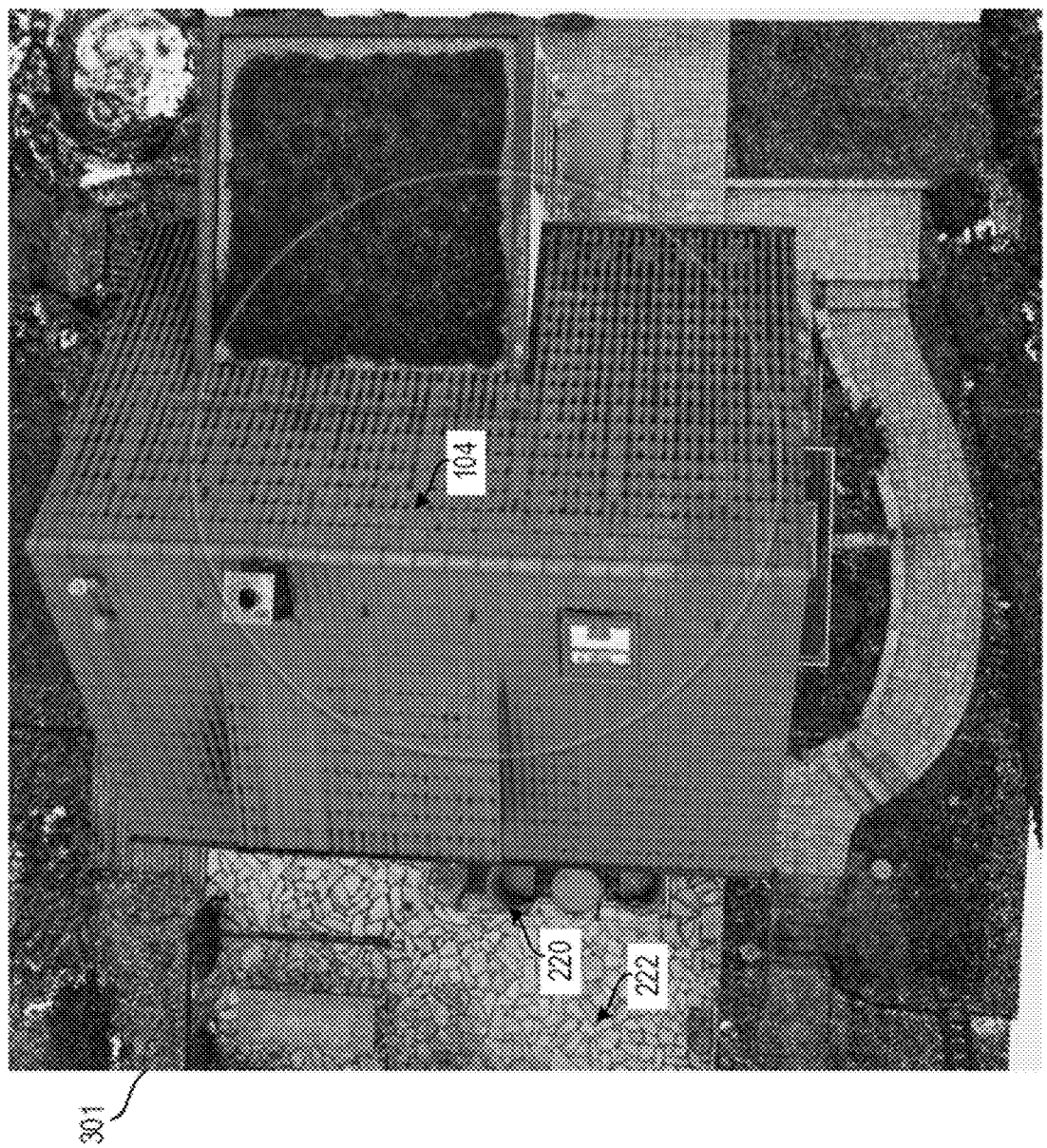
Figure 3B:
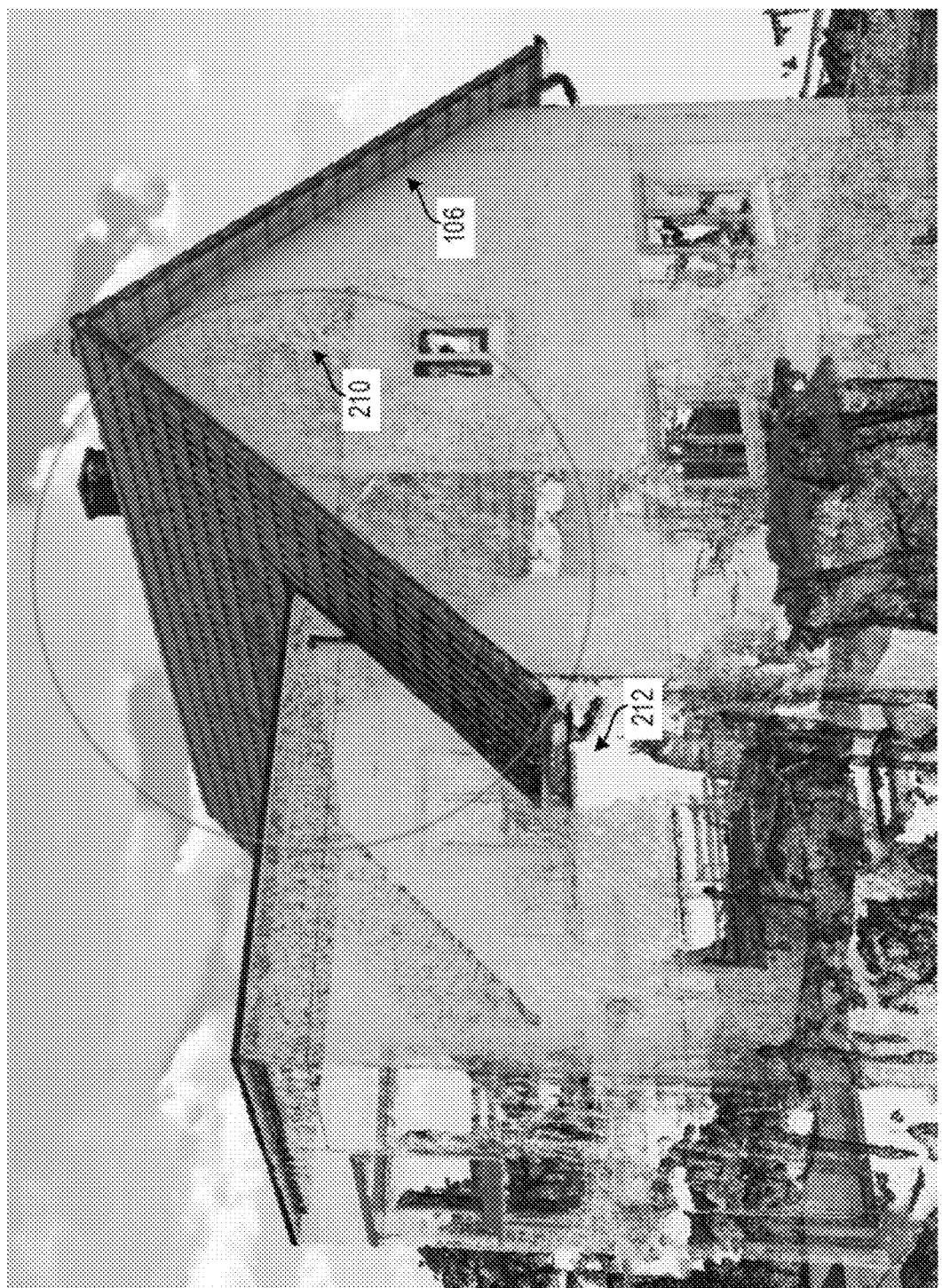

FIGS. 3A and 3B illustrate portions 301, 302 of scans from the scanner 120, which in this example is an aerial scanner scanning along the path 122. As shown in FIG. 3A, the portion 301 has many points on the roof 104, the balcony 220, and the terrace 222 in contrast to the portions 201-203 of FIG. 2A. As shown in FIG. 3B, the portion 203 has low point density on the façade 210, no (or very few) data points on the soffit 106, and no (or very few) data points on the undercuts 212.

It may therefore be desirable to combine data from the scanners 110, 120 to more adequately capture the structure 100. Particularly, the combined data enables additional data analysis that may not be possible from a ground-based scanner or an aerial scanner individually.

However, combining data from the scanners 110, 120 can be difficult. For example, because the scanners 110, 120 have different viewpoints, the data may have few overlapping areas, different point density, etc. Further, objects like spheres or other geometries identified in the data may be too small to perform alignment. Combining data from scanners is traditionally very time intensive and not robust against errors. It should be appreciated that scanners 110, 120 may further be different types of scanners (e.g. TOF versus an area scanner) that have different levels of accuracy.

Figure 4A:
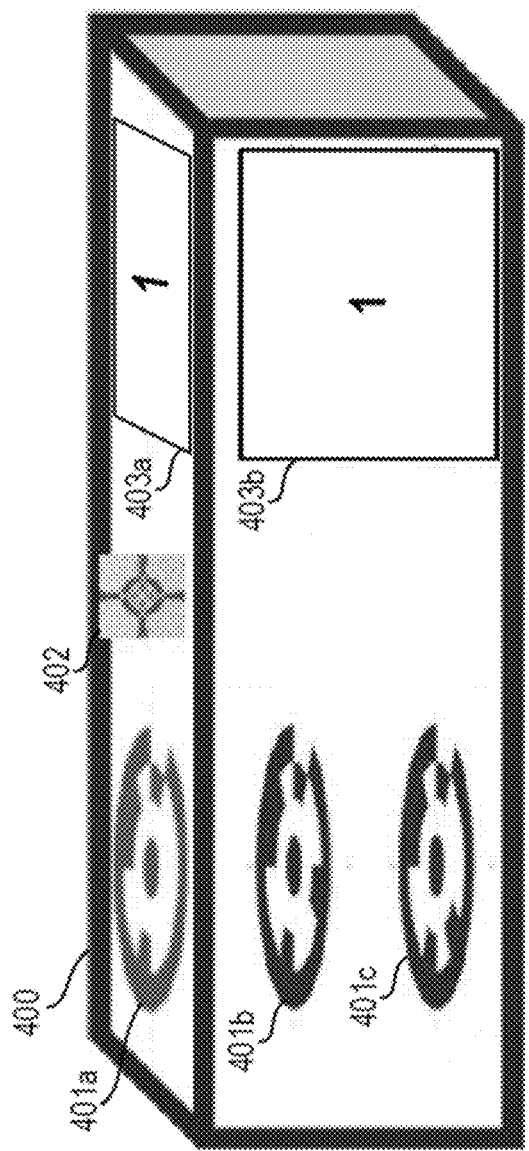
FIGS. 4A-4E depict reference objects according to one or more embodiments described herein.

To address these and other deficiencies with traditional approaches to data alignment (such as alignment of data from different scans performed by different scanners), the present techniques utilize reference objects (also referred to as "targets," "reference targets," "ankers" or "reference anchors") to align the data between two scanners. FIG. 4A depicts an example of a reference object 400 according to one or more embodiments described herein. The reference object 400 is a portable object that can be placed at a location in or around an environment to be scanned (see, e.g., FIG. 6). When a scanner (e.g., one of the scanners 110, 120) captures a first scan of the environment, the scan data of the first scan will include the reference object 400. Then, when another scanner (e.g., the other of the scanners 110, 120) captures a second scan of the environment, the scan data of the second scan will also include the reference object 400. The reference object 400 can then be used to align the first and second scan.

As shown in FIG. 4A (as well as FIGS. 4B-4D, described herein), the reference object 400 has various indicia printed or otherwise disposed on one or more surfaces of the reference object 400. For example, the reference object 400 includes targets 401a, 401b, 401c, which can be used to align scans. According to one or more embodiments described herein, the reference object 400 additionally or alternatively includes a reflective target. In examples, the reference object 400 additionally or alternatively includes unicode numbers 403a, 403b which can be used to uniquely identify the reference object 400 from a plurality of reference objects. The reference object 400 can be any suitable shape and/or dimension suitable for the scanners and/or the environment to be scanned. According to one or more embodiments described herein, the reference object 400 can be foldable or otherwise collapsible for easy of transport. For example, the reference object 400 can be inflatable so that it can be deflated for transport and inflated for use (i.e., scanning). In some examples, the reference object 400 is two dimensional (e.g., a piece of paper that can be adhered to a flat surface, like a sticker attached to a wall, floor, or roof).

Figure 4D:
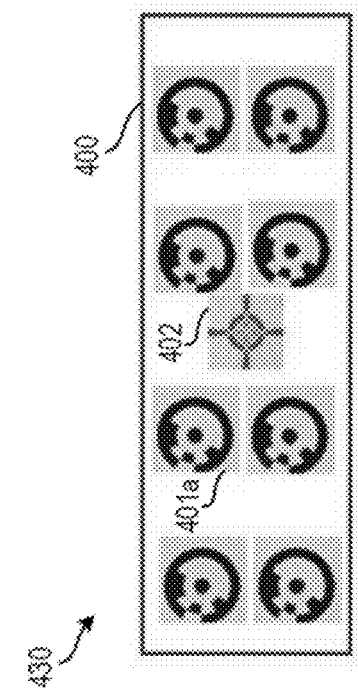
Figure 4E:
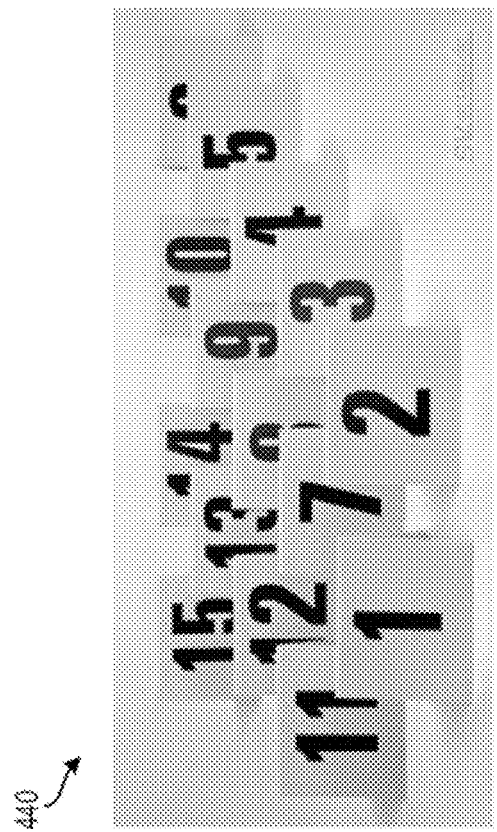
Figure 4B:
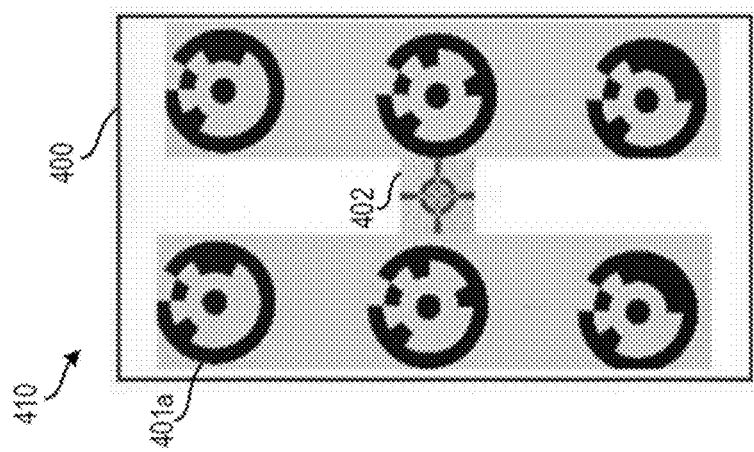
Figure 4C:
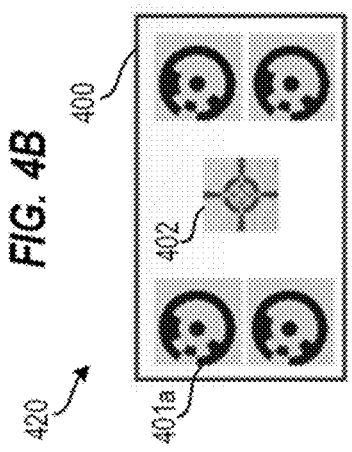

FIG. 4B depicts a top view 410 of the reference object 400 according to one or more embodiments described herein. FIG. 4C depicts a first side (i.e., front/back) view 420 of the reference object 400 according to one or more embodiments described herein. FIG. 4D depicts a second side (i.e., left/right) view 430 of the reference object 400 according to one or more embodiments described herein.

According to an example, the reference object 400 has a parallelepiped shape (e.g. a cuboid) with dimensions of 1 meter by 0.7 meters by 0.5 meters, although other sizes and shapes (e.g. cube, rhombohedron, hexahedron, or prism) are also within the scope of this disclosure. For example, FIG. 4E depicts a plurality of reference objects 440 having two sides, with at least one of the two sides having a unique identifier (indicium) printed or disposed thereon. In this example, the reference objects 400 may be used as evidence markers for scanning suspected crime scene. Examples of such reference objects are further described in U.S. patent application Ser. No. 16/998,688 titled "System and Method of Imaging Evidence at a Scene," which is incorporated by reference herein in its entirety.

Figure 5:
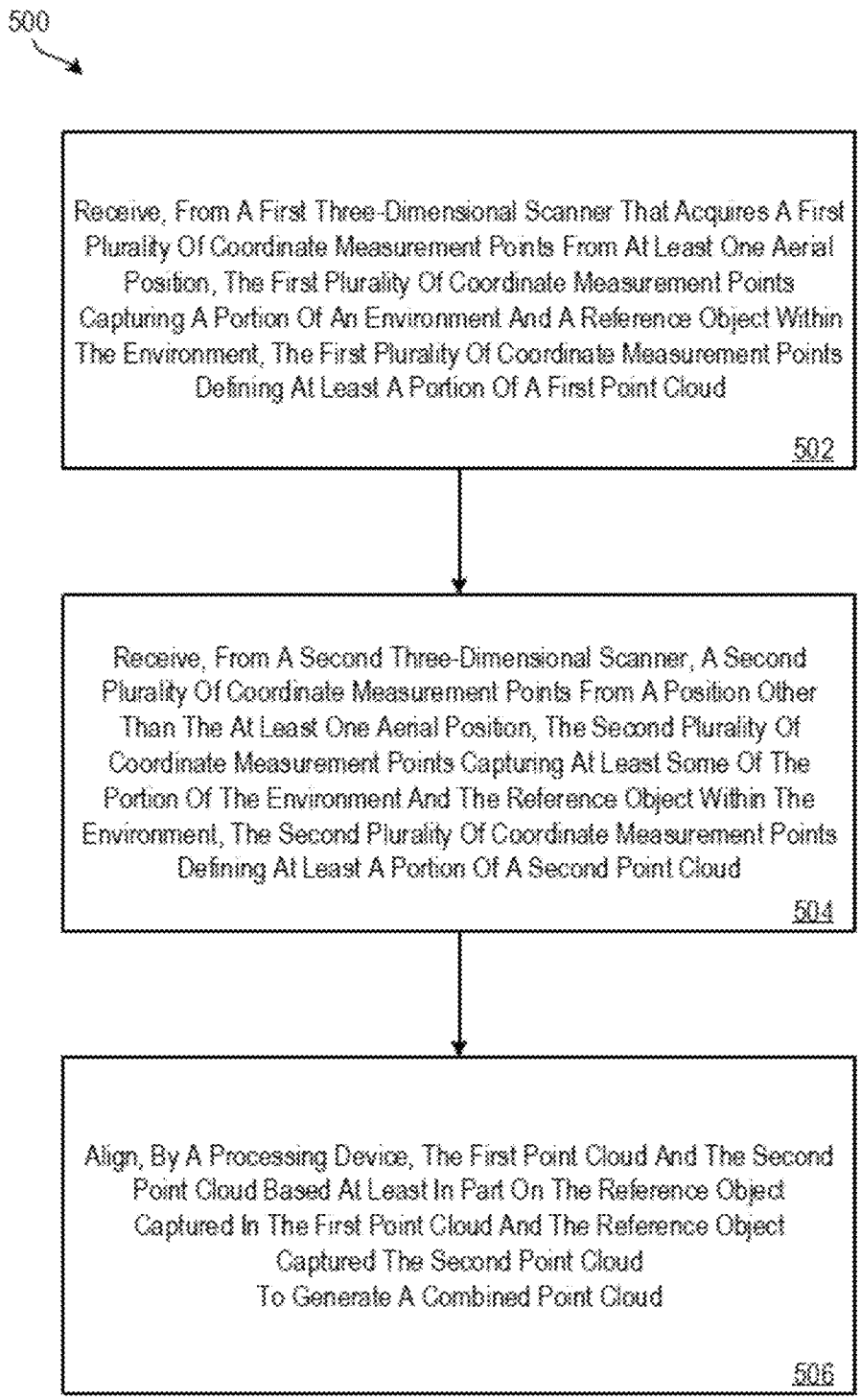
FIG. 5 depicts a flow diagram of a method for aligning data from different scans using a reference object according to one or more embodiments described herein.

FIG. 5 depicts a flow diagram of a method 500 for aligning data from different scans using a reference object according to one or more embodiments described herein. The method 500 can be performed by any suitable processing system (e.g., the processing system 900 of FIG. 9), any suitable processing device (e.g., one or more of the processors 921 of FIG. 9), by a cloud computing node of a cloud computing environment, by a scanner (e.g., by a processing device disposed in one of the scanners described herein), and/or combinations thereof.

Figure 6:
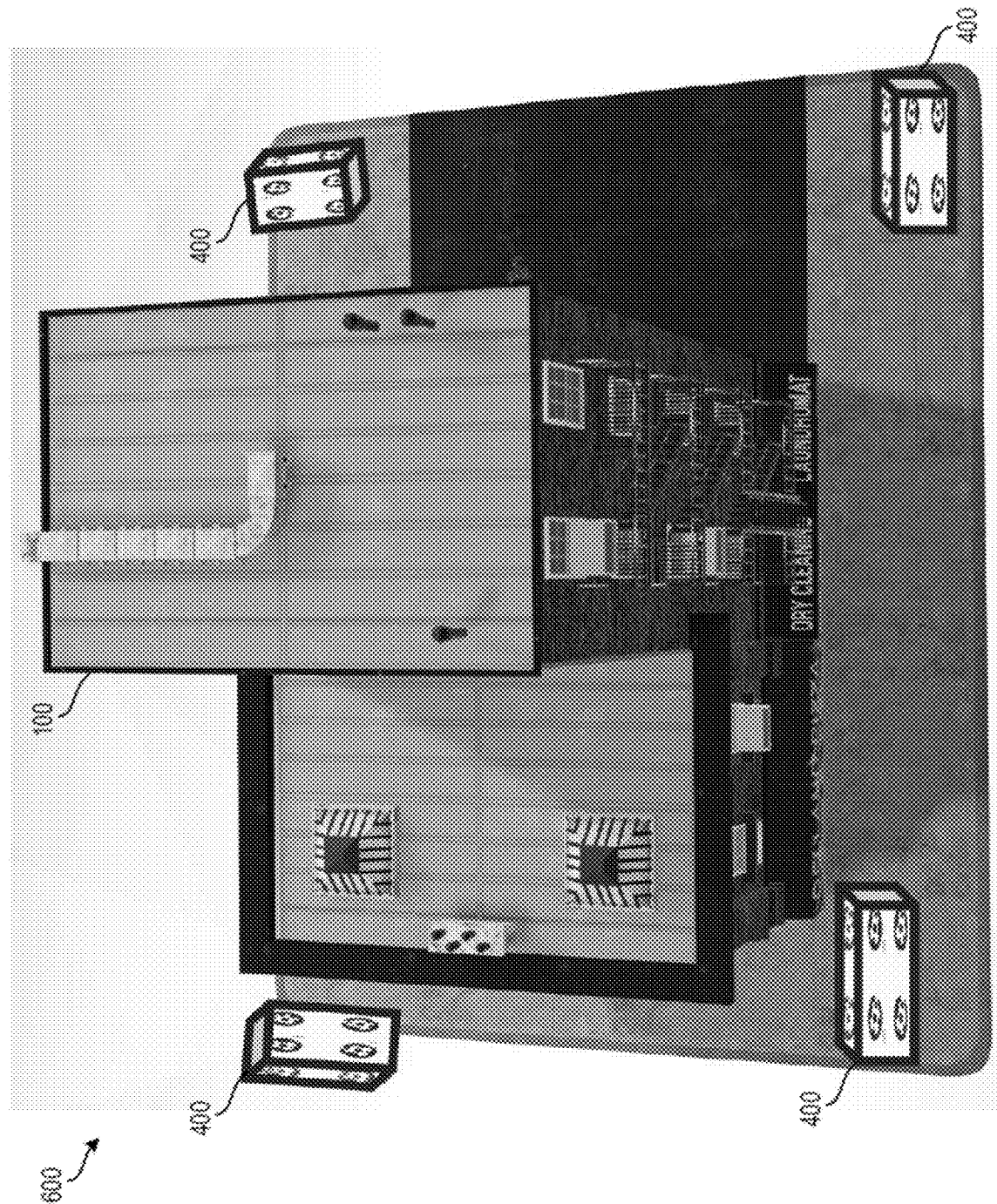
FIG. 6 depicts an environment to be scanned, the environment having reference objects associated therewith, according to one or more embodiments described herein.

At block 502, a processing system (e.g., the processing system 900 of FIG. 9) receives, from a first scanner, a first plurality of coordinate measurement points. The first three-dimensional scanner acquires the first plurality of coordinate measurement points from an aerial position(s). The first plurality of measurement points capture a portion of an environment and a reference object within the environment. The first plurality of coordinate measurement points define at least a portion of a first point cloud. For example, the scanner 120 represents a scanner and/or camera and a drone arrangement that can fly around the structure 100 along the path 122 to capture a scan of the structure 100 from an elevated/aerial position relative to the scanner 110. According to one or more embodiments described herein, the scanner 120 captures 2D images using a camera, and the 2D images form the scan. For example, the scanner 120 can capture 2D images and use photogrammetry techniques to piece together the 2D images to create a 3D point cloud. According to one or more embodiments described herein the scanner 120 captures 3D data using a scanner, such as the scanner 1000 of FIG. 10 or another suitable 3D coordinate measurement device, and the 3D data forms the scan as a 3D point cloud. According to one or more embodiments described herein, the scanner 120 captures 2D images and 3D data which, together, form the scan. According to one or more embodiments described herein, the scanner 120 can include 3D camera (also known as a time-of-flight camera or RGB-D camera) to obtain the point cloud rather than or in addition to a 2D camera. The first image captures at least a portion of an environment (e.g., the structure 100) and a reference object (e.g., the reference object 400). For example, as shown in FIG. 6, reference objects 400 can be placed around/throughout a environment 600 to be scanned. The scanner 120 flies through the environment 600 capturing scan data in the form of images of the structure 100 and/or of the environment 600. Included in the images are portion of the structure 100/the environment 600 as well as the reference objects 400. In some examples, the images have timestamps associated therewith. According to examples, the reference object can have a defined geometry (e.g., a particular shape and/or size that is known, such as a cuboid). The reference object can have an indicium disposed on one or more of its surfaces, such as shown in FIGS. 4A-4E.

At block 504, the processing system receives, from a second scanner, a second plurality of coordinate measurement points from a position other than the aerial position(s). The second plurality of coordinate measurement points capture at least some of the portion of the environment and the reference object within the environment. The second plurality of coordinate measurement points define at least a portion of a second point cloud. The second point cloud can have time stamps associated with the data points. For example, the scanner 110, which may be associated with a mobile base, cart, etc., scans the structure 100/the environment 600 along the path 112 and captures some or all of the portion of the environment 600 that the scanner 120 captured.

At block 506, the processing system aligns the first point cloud and the second point cloud based at least in part on the reference object captured in the first point cloud and the reference object captured in the second point cloud to generate a combined point cloud. According to one or more embodiments described herein, the alignment is performed by identifying the reference objects 400. The reference objects 400 can be identified using artificial intelligence or other vision techniques based on known information about the reference objects 400 (e.g., size, shape, indicium disposed thereon, GPS coordinates associated with the reference objects, etc.). Once the reference objects 400 are identified, the first and second point clouds are merged based on the identified reference objects 400. As an example, the merging can be performed using planes. In such an example, a first plane of a particular reference object from first point cloud is identified and then a plane of the same reference object from the second data set is identified. Planes from the first and second point clouds are then identified for a second reference object. Then, using the planes for the two distinct reference objects, alignment is performed by aligning the planes.

Additional processes also may be included, and it should be understood that the process depicted in FIG. 5 represents an illustration, and that other processes may be added or existing processes may be removed, modified, or rearranged without departing from the scope of the present disclosure.

Figure 7:
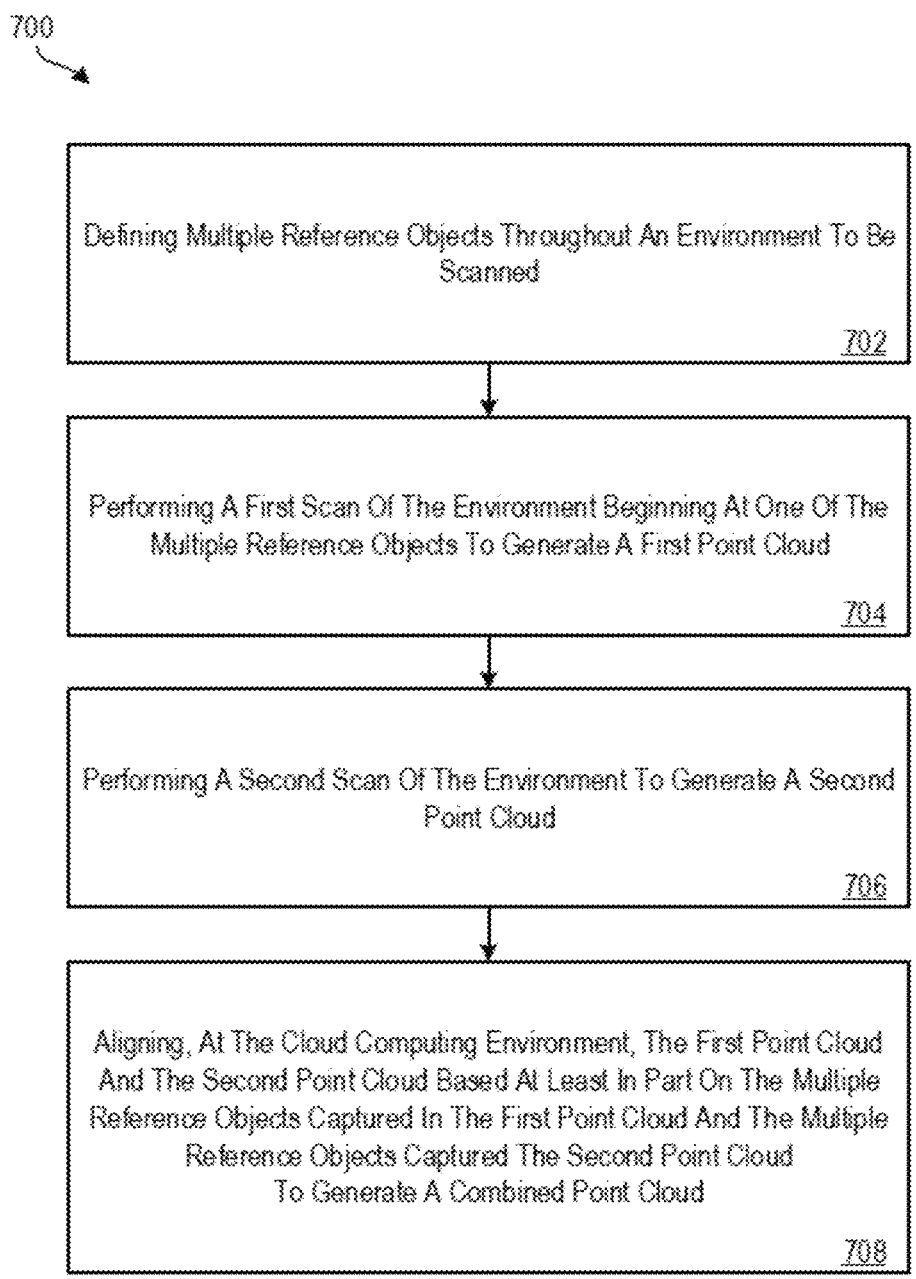
FIG. 7 depicts a flow diagram of a method 700 for aligning data from different scans using a reference object according to one or more embodiments described herein.

FIG. 7 depicts a flow diagram of a method 700 for aligning data from different scans using a reference object according to one or more embodiments described herein. The method 700 can be performed by any suitable processing system (e.g., the processing system 900 of FIG. 9), any suitable processing device (e.g., one or more of the processors 921 of FIG. 9), by a cloud computing node of a cloud computing environment, by a scanner (e.g., by a processing device disposed in one of the scanners described herein), and/or combinations thereof.

At block 702, multiple reference objects are defined throughout an environment to be scanned (see, e.g., FIG. 6). At block 704, a first scan of the environment is performed beginning at one of the multiple reference objects to generate a first point cloud. The first scan is performed by capturing (along a first path) a first plurality of coordinate points of the environment including the multiple reference objects, the first plurality of coordinate points defining at least a portion of a first point cloud, and uploading the first point cloud to a cloud computing environment. At block 706, a second scan of the environment is performed. The second scan is performed by capturing (along a second path) a second plurality of coordinate points of the environment including the multiple reference objects, the second plurality of coordinate points forming at least a portion of a second point cloud, and uploading the second point cloud to the cloud computing environment. At block 708, the first point cloud is aligned with the second point cloud based at least in part on the multiple reference objects captured in the first point cloud and the multiple reference objects captured the second point cloud to generate a combined point cloud.

Additional processes also may be included, and it should be understood that the process depicted in FIG. 7 represents an illustration, and that other processes may be added or existing processes may be removed, modified, or rearranged without departing from the scope of the present disclosure.

Figure 8:
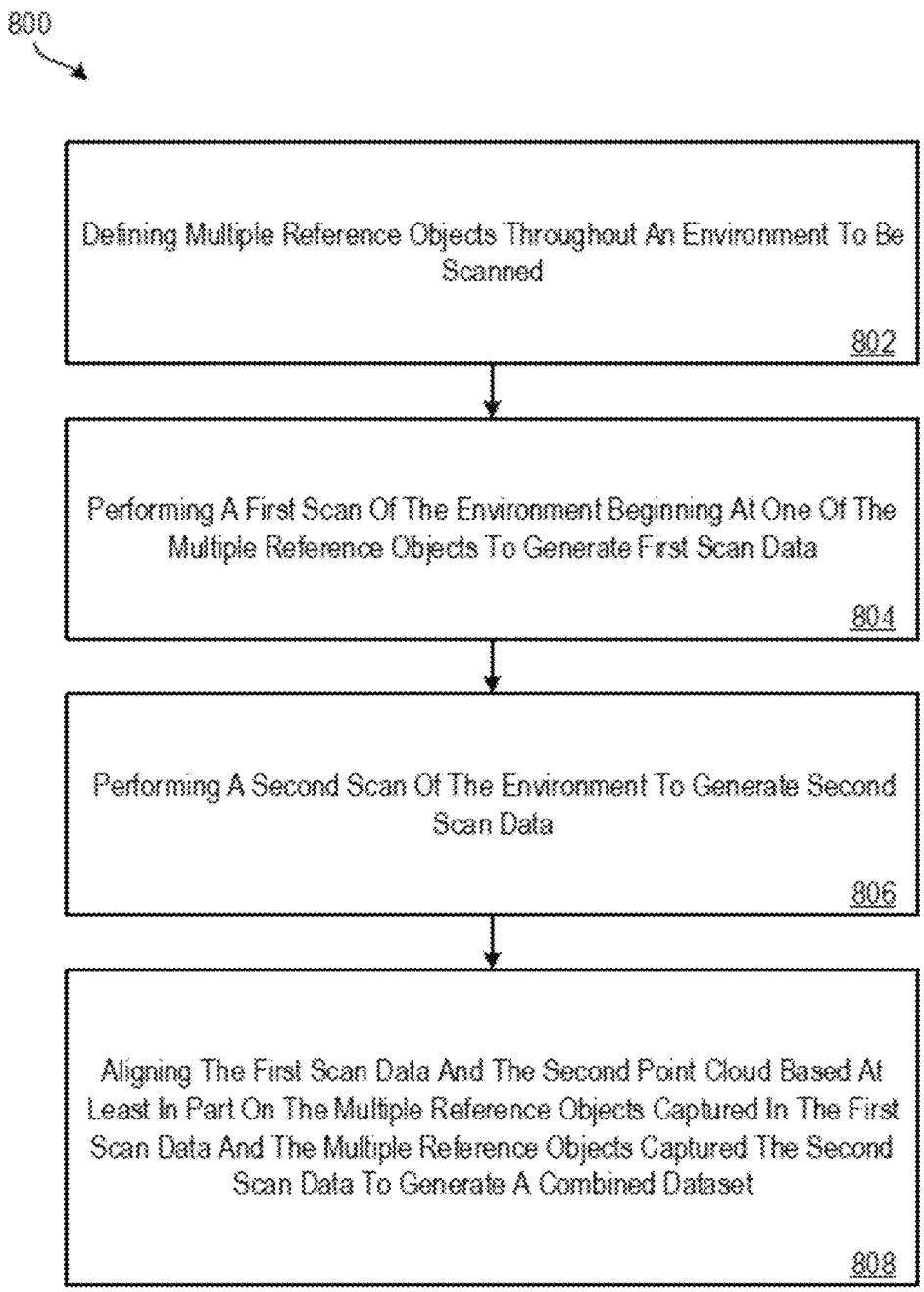
FIG. 8 depicts a flow diagram of a method 800 for aligning data from different scans using a reference object according to one or more embodiments described herein.

FIG. 8 depicts a flow diagram of a method 800 for aligning data from different scans using a reference object according to one or more embodiments described herein. The method 800 can be performed by any suitable processing system (e.g., the processing system 900 of FIG. 9), any suitable processing device (e.g., one or more of the processors 921 of FIG. 9), by a cloud computing node of a cloud computing environment, by a scanner (e.g., by a processing device disposed in one of the scanners described herein), and/or combinations thereof.

At block 802, multiple reference objects are defined throughout an environment to be scanned (see, e.g., FIG. 6). At block 804, a first scan of the environment is performed beginning at one of the multiple reference objects. The first scan is performed by capturing (along a first path) first scan data of the environment including the multiple reference objects, and uploading the first scan data to a processing system. At block 806, a second scan of the environment is performed. The second scan is performed by capturing (along a second path) second scan data of the environment including the multiple reference objects, and uploading the second scan data to the processing system. At block 808, the first scan data is aligned to the second scan data based at least in part on the multiple reference objects captured in the first scan data and the multiple reference objects captured the second scan data to generate a combined dataset. The combined dataset can be a point cloud or other suitable form of data which includes data from both the first scan data and the second scan data.

As described herein, it should be appreciated that uploading data from a scanner to a processing system, a cloud computing environment, etc., can be performed using direct and/or indirect wired and/or wireless communication techniques, such as cellular communication, Ethernet, etc.

Additional processes also may be included, and it should be understood that the process depicted in FIG. 8 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide for aligning scans of an environment using a reference object. Particularly, the present techniques use a reference object (or multiple reference objects) places in or around an environment to be scanned to align scan data (i.e., images, point clouds, etc.) captured by two or more scanners (one scanner capturing two or more scans). A combined dataset or point cloud is generated as a result, which enables more detailed analysis of the scanned environment than a single dataset would. These aspects of the disclosure constitute technical features that yield the technical effect of reducing the amount of time needed to combine such datasets while also providing a more robust dataset because the dataset is more complete (e.g., areas with low or no data in one scan may be captured by the other scan). As a result of these technical features and technical effects, alignment techniques in accordance with example embodiments of the disclosure represents an improvement to existing scanning technologies. It should be appreciated that the above examples of technical features, technical effects, and improvements to technology of example embodiments of the disclosure are merely illustrative and not exhaustive.

Figure 9:
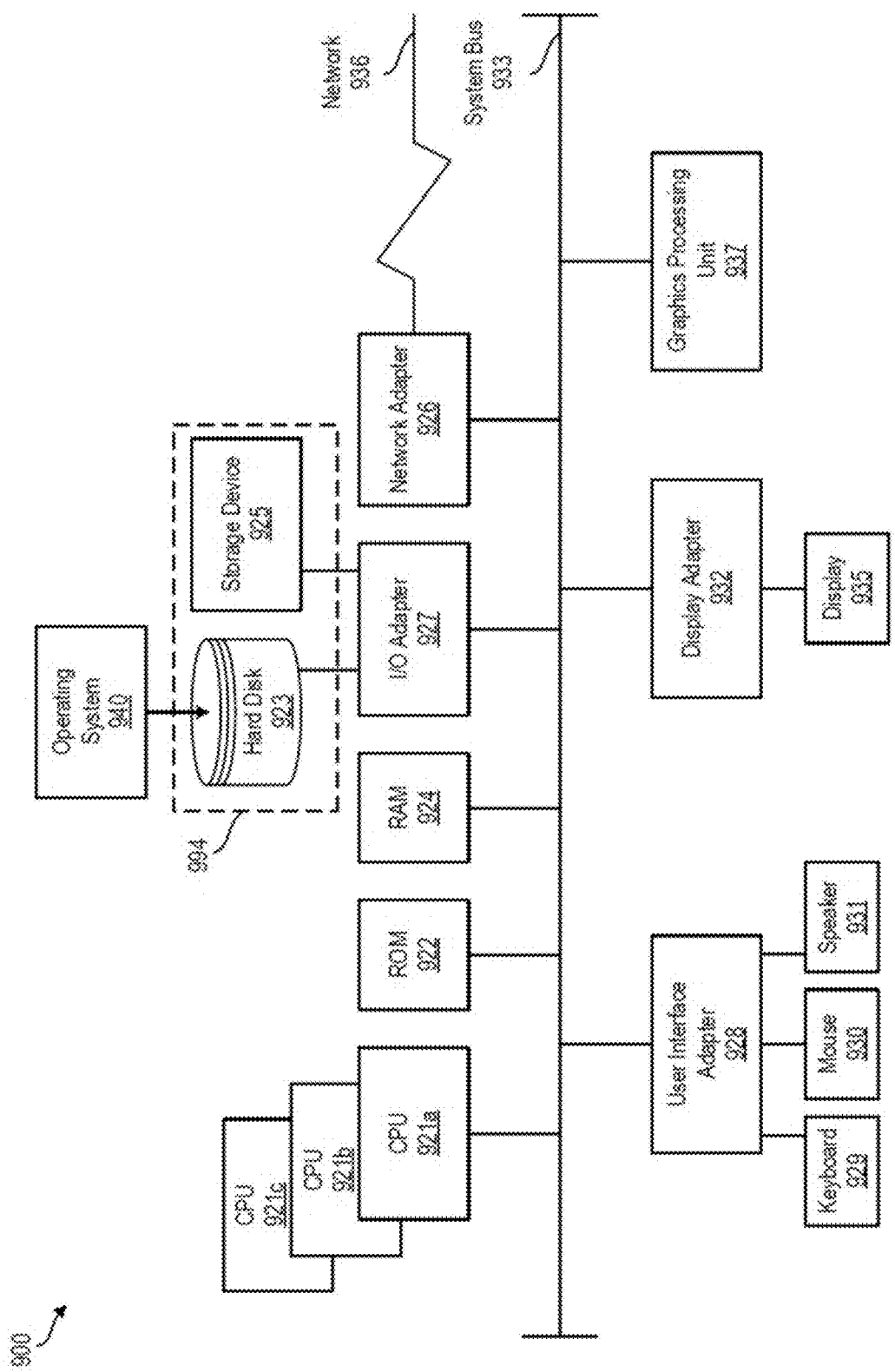
FIG. 9 depicts a block diagram of a processing system 900 for implementing the techniques described herein.

It is understood that one or more embodiments described herein is capable of being implemented in conjunction with any other type of computing environment now known or later developed. For example, FIG. 9 depicts a block diagram of a processing system 900 for implementing the techniques described herein. In accordance with one or more embodiments described herein, the processing system 900 is an example of a cloud computing node of a cloud computing environment. In examples, processing system 900 has one or more central processing units ("processors" or "processing resources") 921a, 921b, 921c, etc. (collectively or generically referred to as processor(s) 921 and/or as processing device(s)). In aspects of the present disclosure, each processor 921 can include a reduced instruction set computer (RISC) microprocessor. Processors 921 are coupled to system memory (e.g., random access memory (RAM) 924) and various other components via a system bus 933. Read only memory (ROM) 922 is coupled to system bus 933 and may include a basic input/output system (BIOS), which controls certain basic functions of processing system 900.

Further depicted are an input/output (I/O) adapter 927 and a network adapter 926 coupled to system bus 933. I/O adapter 927 may be a small computer system interface (SCSI) adapter that communicates with a hard disk 923 and/or a storage device 925 or any other similar component. I/O adapter 927, hard disk 923, and storage device 925 are collectively referred to herein as mass storage 934. Operating system 940 for execution on processing system 900 may be stored in mass storage 934. The network adapter 926 interconnects system bus 933 with an outside network 936 enabling processing system 900 to communicate with other such systems.

A display (e.g., a display monitor) 935 is connected to system bus 933 by display adapter 932, which may include a graphics adapter to improve the performance of graphics intensive applications and a video controller. In one aspect of the present disclosure, adapters 926, 927, and/or 932 may be connected to one or more I/O busses that are connected to system bus 933 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 933 via user interface adapter 928 and display adapter 932. A keyboard 929, mouse 930, and speaker 931 may be interconnected to system bus 933 via user interface adapter 928, which may include, for example, a Super I/O chip integrating multiple device adapters into a single integrated circuit.

In some aspects of the present disclosure, processing system 900 includes a graphics processing unit 937. Graphics processing unit 937 is a specialized electronic circuit designed to manipulate and alter memory to accelerate the creation of images in a frame buffer intended for output to a display. In general, graphics processing unit 937 is very efficient at manipulating computer graphics and image processing, and has a highly parallel structure that makes it more effective than general-purpose CPUs for algorithms where processing of large blocks of data is done in parallel.

Thus, as configured herein, processing system 900 includes processing capability in the form of processors 921, storage capability including system memory (e.g., RAM 924), and mass storage 934, input means such as keyboard 929 and mouse 930, and output capability including speaker 931 and display 935. In some aspects of the present disclosure, a portion of system memory (e.g., RAM 924) and mass storage 934 collectively store the operating system 940 such as the AIX® operating system from IBM Corporation to coordinate the functions of the various components shown in processing system 900.

Figure 10:
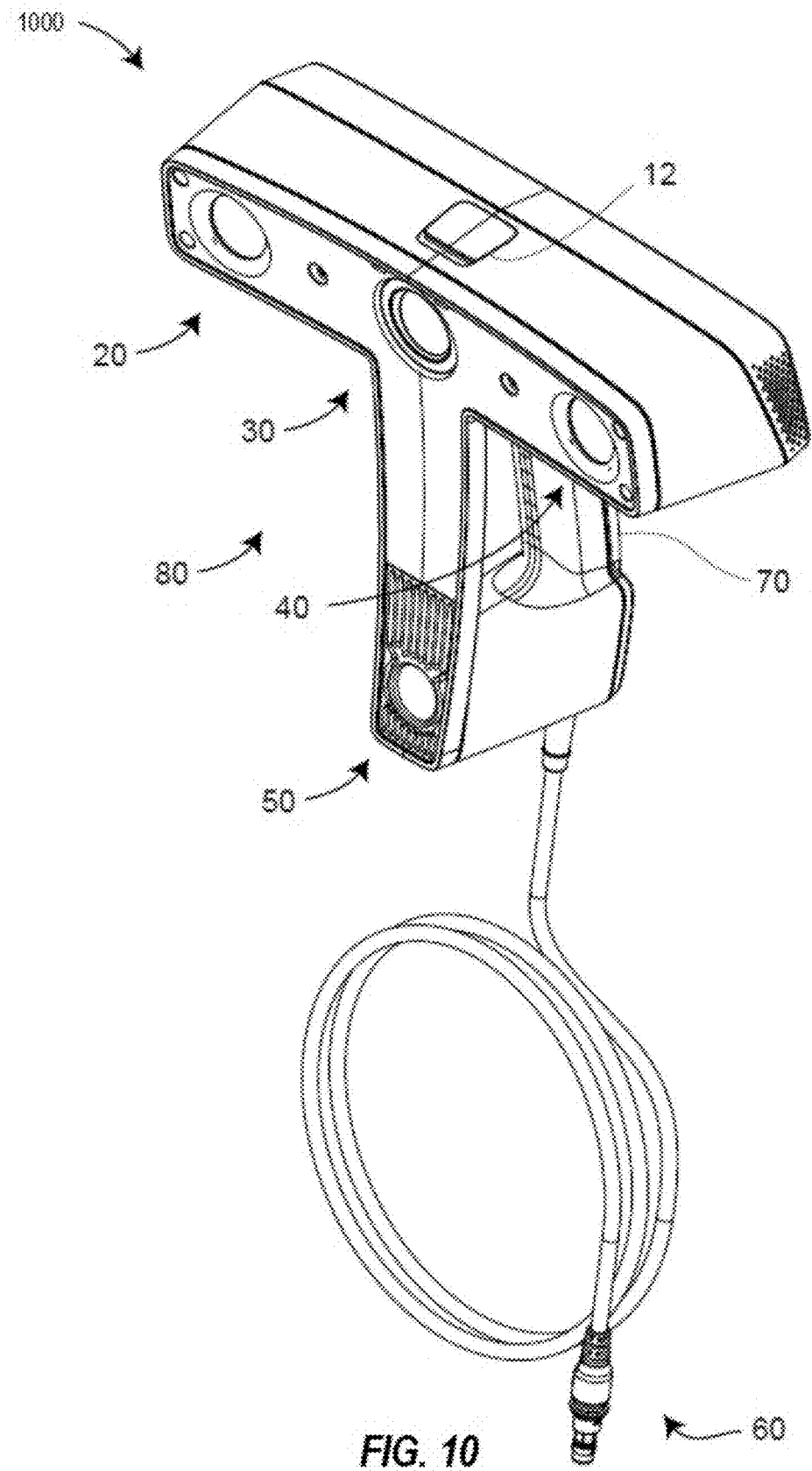
FIGS. 10 and 11 depict an embodiment of an area/structured-light scanner according to one or more embodiments described herein.
Figure 11:
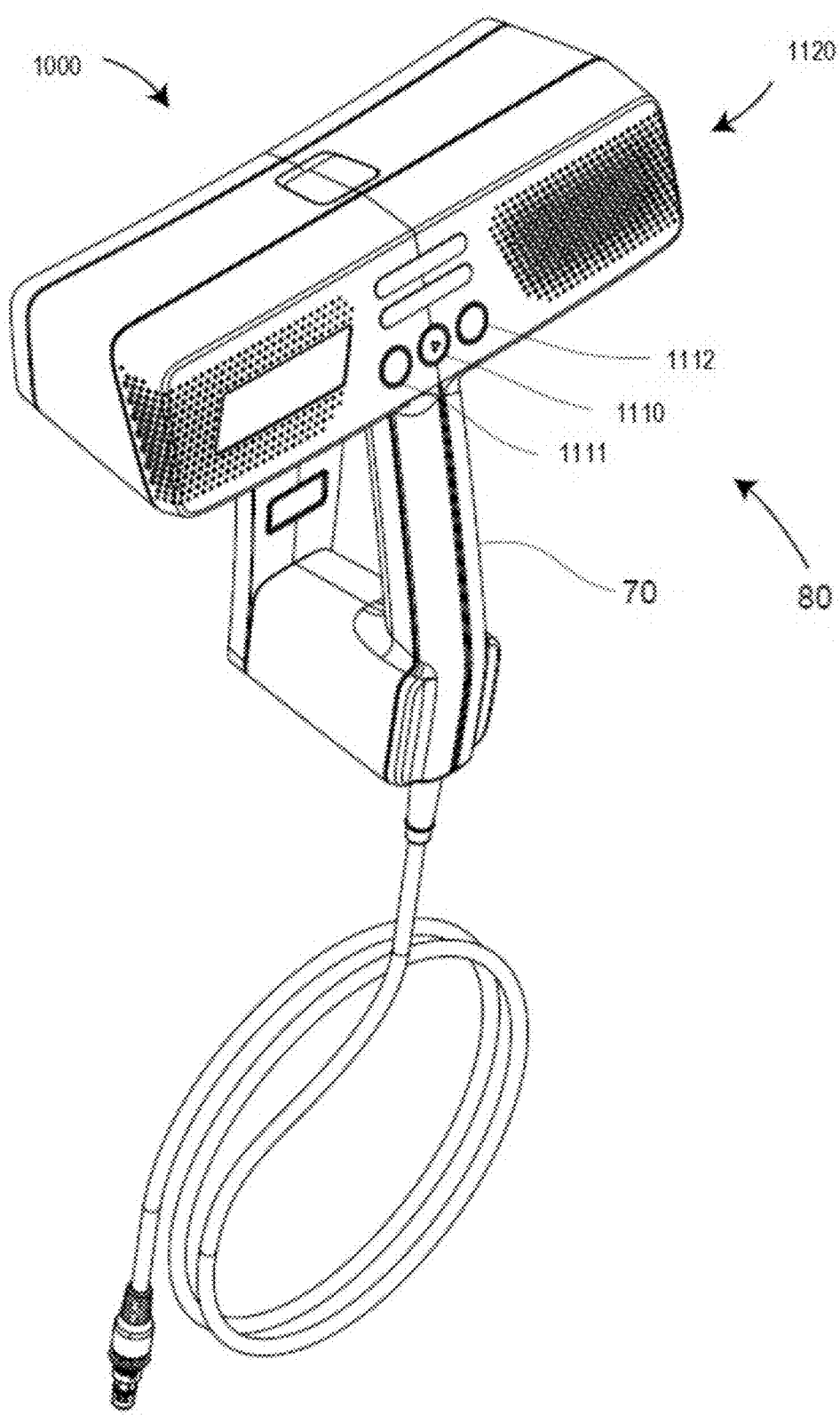

FIG. 10 is a front isometric view of a handheld 3D triangulation scanner 1000, also referred to as a handheld 3D imager. The scanner 1000 is an example of the scanner 110 and/or the scanner 120. For example, the scanner 1000 can be associated with a drone, which together form the scanner 120 (i.e., an aerial scanner). In another example, the scanner 1000 can be associated with a mobile base, cart, etc. or carried by a person, such that the scanner 1000 is a terrestrial scanner. In an embodiment, the scanner 1000 includes a first infrared (IR) camera 20, a second IR camera 40, a registration camera 30, a projector 50, an Ethernet cable 60 and a handle 70. In an embodiment, the registration camera 30 is a color camera. Ethernet is a family of computer networking technologies standardized under IEEE 802.3. The enclosure 80 includes the outmost enclosing elements of the scanner 1000, as explained in more detail herein below. FIG. 11 is a rear perspective view of the scanner 1000 further showing an exemplary perforated rear cover 1120 and a scan start/stop button 1110. In an embodiment, buttons 1111, 1112 may be programmed to perform functions according to the instructions of a computer program, the computer program either stored internally within the scanner 1000 or externally in an external computer. In an embodiment, each of the buttons 1110, 1111, 1112 includes at its periphery a ring illuminated by a light emitting diode (LED). Further features and functionality of the scanner 1000 is described in U.S. Patent Application Ser. No. 62/818,923, which is incorporated by reference in its entirety.

Referring now to FIGS. 12-15, a laser scanner 1220 is shown for optically scanning and measuring the environment surrounding the laser scanner 1220. It should be appreciated that while embodiments herein describe a phase-based time of flight scanner, this is for example purposes and the claims should not be so limited. In other embodiments, other types of three-dimensional (3D) coordinate measurement devices may be used to generate a point cloud. These 3D coordinate measurement devices include pulsed time of flight scanners, photogrammetry devices, laser line probes, triangulations scanners, area scanners, laser trackers, structured light scanners, and articulated arm coordinate measurement machines for example. The laser scanner 1220 has a measuring head 1222 and a base 1224. The measuring head 1222 is mounted on the base 1224 such that the laser scanner 1220 may be rotated about a vertical axis 1223. In one embodiment, the measuring head 1222 includes a gimbal point 1227 that is a center of rotation about the vertical axis 1223 and a horizontal axis 1225. The measuring head 1222 has a rotary mirror 1226, which may be rotated about the horizontal axis 1225. The rotation about the vertical axis may be about the center of the base 1224. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 1222 is further provided with an electromagnetic radiation emitter, such as light emitter 1228, for example, that emits an emitted light beam 1229. In one embodiment, the emitted light beam 1229 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 1229 is amplitude or intensity modulated, for example, with a sinusoidal waveform or with a rectangular waveform. The emitted light beam 1229 is emitted by the light emitter 1228 onto a beam steering unit, such as mirror 1226, where it is deflected to the environment. A reflected light beam 1232 is reflected from the environment by an object 1234. The reflected or scattered light is intercepted by the rotary mirror 1226 and directed into a light receiver 1236. The directions of the emitted light beam 1229 and the reflected light beam 1232 result from the angular positions of the rotary mirror 1226 and the measuring head 1222 about the axes 1225 and 1223, respectively. These angular positions in turn depend on the corresponding rotary drives or motors.

Coupled to the light emitter 1228 and the light receiver 1236 is a controller 1238. The controller 1238 determines, for a multitude of measuring points X, a corresponding number of distances d between the laser scanner 1220 and the points X on object 1234. The distance to a particular point X is determined based at least in part on the speed of light in air through which electromagnetic radiation propagates from the device to the object point X. In one embodiment the phase shift of modulation in light emitted by the laser scanner 1220 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 1220 takes place by rotating the rotary mirror 1226 relatively quickly about axis 1225 while rotating the measuring head 1222 relatively slowly about axis 23, thereby, moving the assembly in a spiral pattern. In an exemplary embodiment, the rotary mirror rotates at a maximum speed of 5820 revolutions per minute. For such a scan, the gimbal point 1227 defines the origin of the local stationary reference system. The base 1224 rests in this local stationary reference system. In addition to measuring a distance d from the gimbal point 1227 to an object point X, the scanner 1220 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

In addition to measuring a distance d from the gimbal point 1227 to an object point X, the scanner 1220 may also collect gray-scale information related to the received optical power (equivalent to the term "brightness.") The gray-scale value may be determined at least in part, for example, by integration of the bandpass-filtered and amplified signal in the light receiver 1236 over a measuring period attributed to the object point X.

Figure 12:
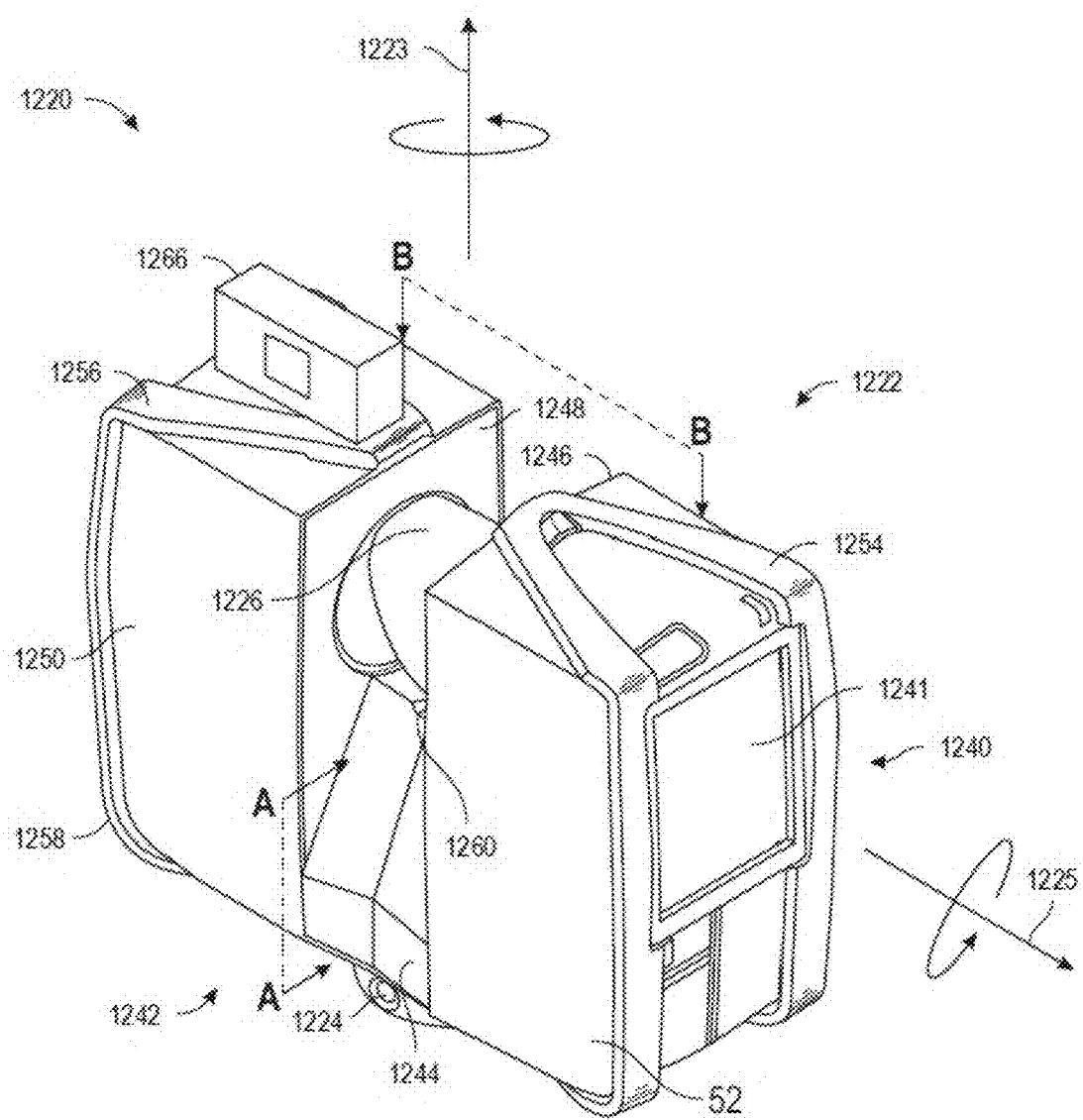
FIGS. 12-15 depict another embodiment of a TOF scanner according to one or more embodiments described herein.

The measuring head 1222 may include a display device 1240 integrated into the laser scanner 1220. The display device 1240 may include a graphical touch screen 1241, as shown in FIG. 12, which allows the operator to set the parameters or initiate the operation of the laser scanner 1220. For example, the screen 1241 may have a user interface that allows the operator to provide measurement instructions to the device, and the screen may also display measurement results.

The laser scanner 1220 includes a carrying structure 1242 that provides a frame for the measuring head 1222 and a platform for attaching the components of the laser scanner 1220. In one embodiment, the carrying structure 1242 is made from a metal such as aluminum. The carrying structure 1242 includes a traverse member 1244 having a pair of walls 1246, 1248 on opposing ends. The walls 1246, 1248 are parallel to each other and extend in a direction opposite the base 1224. Shells 1250, 1252 are coupled to the walls 1246, 1248 and cover the components of the laser scanner 1220. In the exemplary embodiment, the shells 1250, 1252 are made from a plastic material, such as polycarbonate or polyethylene for example. The shells 1250, 1252 cooperate with the walls 1246, 1248 to form a housing for the laser scanner 1220.

On an end of the shells 1250, 1252 opposite the walls 1246, 1248 a pair of yokes 1254, 1256 are arranged to partially cover the respective shells 1250, 1252. In the exemplary embodiment, the yokes 1254, 1256 are made from a suitably durable material, such as aluminum for example, that assists in protecting the shells 1250, 1252 during transport and operation. The yokes 1254, 1256 each includes a first arm portion 1258 that is coupled, such as with a fastener for example, to the traverse 1244 adjacent the base 1224. The arm portion 1258 for each yoke 1254, 1256 extends from the traverse 1244 obliquely to an outer corner of the respective shell 1250, 1252. From the outer corner of the shell, the yokes 1254, 1256 extend along the side edge of the shell to an opposite outer corner of the shell. Each yoke 1254, 1256 further includes a second arm portion that extends obliquely to the walls 1246, 1248. It should be appreciated that the yokes 1254, 1256 may be coupled to the traverse 1242, the walls 1246, 1248 and the shells 1250, 1252 at multiple locations.

The pair of yokes 1254, 1256 cooperate to circumscribe a convex space within which the two shells 1250, 1252 are arranged. In the exemplary embodiment, the yokes 1254, 1256 cooperate to cover all of the outer edges of the shells 1250, 1252, while the top and bottom arm portions project over at least a portion of the top and bottom edges of the shells 1250, 1252. This provides advantages in protecting the shells 1250, 1252 and the measuring head 1222 from damage during transportation and operation. In other embodiments, the yokes 1254, 1256 may include additional features, such as handles to facilitate the carrying of the laser scanner 1220 or attachment points for accessories for example.

On top of the traverse 1244, a prism 1260 is provided. The prism extends parallel to the walls 1246, 1248. In the exemplary embodiment, the prism 1260 is integrally formed as part of the carrying structure 1242. In other embodiments, the prism 1260 is a separate component that is coupled to the traverse 1244. When the mirror 1226 rotates, during each rotation the mirror 1226 directs the emitted light beam 1229 onto the traverse 1244 and the prism 1260. Due to nonlinearities in the electronic components, for example in the light receiver 1236, the measured distances d may depend on signal strength, which may be measured in optical power entering the scanner or optical power entering optical detectors within the light receiver 1236, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 1236. Since the prism 1260 is at a known distance from the gimbal point 1227, the measured optical power level of light reflected by the prism 1260 may be used to correct distance measurements for other measured points, thereby allowing for compensation to correct for the effects of environmental variables such as temperature. In the exemplary embodiment, the resulting correction of distance is performed by the controller 1238.

In an embodiment, the base 1224 is coupled to a swivel assembly (not shown) such as that described in commonly owned U.S. Pat. No. 8,705,012 ('012), which is incorporated by reference herein. The swivel assembly is housed within the carrying structure 1242 and includes a motor 12138 that is configured to rotate the measuring head 1222 about the axis 1223. In an embodiment, the angular/rotational position of the measuring head 1222 about the axis 1223 is measured by angular encoder 134.

An auxiliary image acquisition device 1266 may be a device that captures and measures a parameter associated with the scanned area or the scanned object and provides a signal representing the measured quantities over an image acquisition area. The auxiliary image acquisition device 1266 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 12112 is located internally to the scanner and may have the same optical axis as the 3D scanner device. In this embodiment, the first image acquisition device 12112 is integrated into the measuring head 1222 and arranged to acquire images along the same optical pathway as emitted light beam 1229 and reflected light beam 1232. In this embodiment, the light from the light emitter 1228 reflects off a fixed mirror 12116 and travels to dichroic beam-splitter 12118 that reflects the light 12117 from the light emitter 1228 onto the rotary mirror 1226. In an embodiment, the mirror 1226 is rotated by a motor 12136 and the angular/rotational position of the mirror is measured by angular encoder 12134. The dichroic beam-splitter 12118 allows light to pass through at wavelengths different than the wavelength of light 12117. For example, the light emitter 1228 may be a near infrared laser light (for example, light at wavelengths of 780 nm or 1150 nm), with the dichroic beam-splitter 12118 configured to reflect the infrared laser light while allowing visible light (e.g., wavelengths of 400 to 700 nm) to transmit through. In other embodiments, the determination of whether the light passes through the beam-splitter 12118 or is reflected depends on the polarization of the light. The digital camera 12111 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 1223 and by steering the mirror 1226 about the axis 1225.

Figure 13:
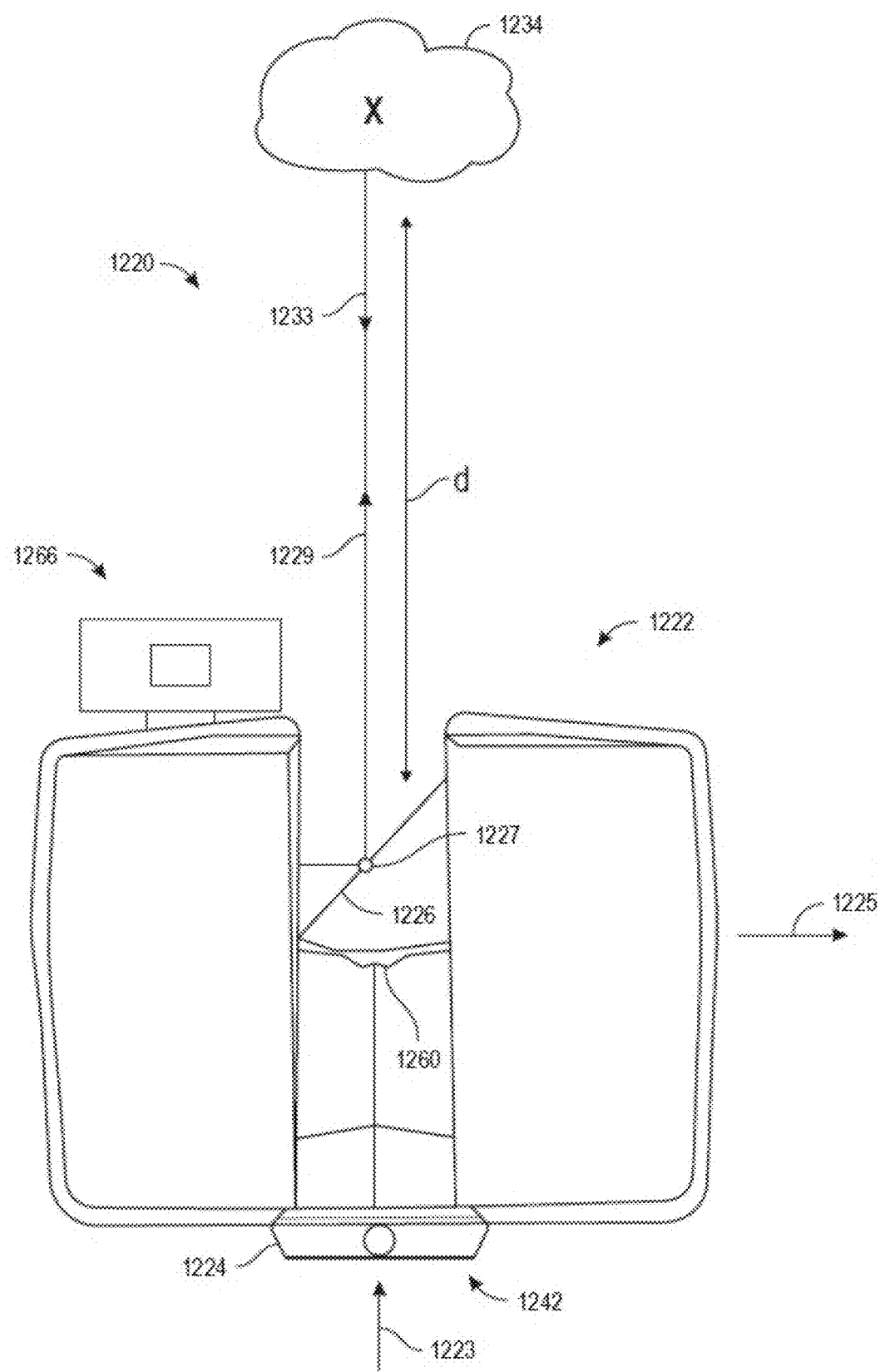
Figure 14:
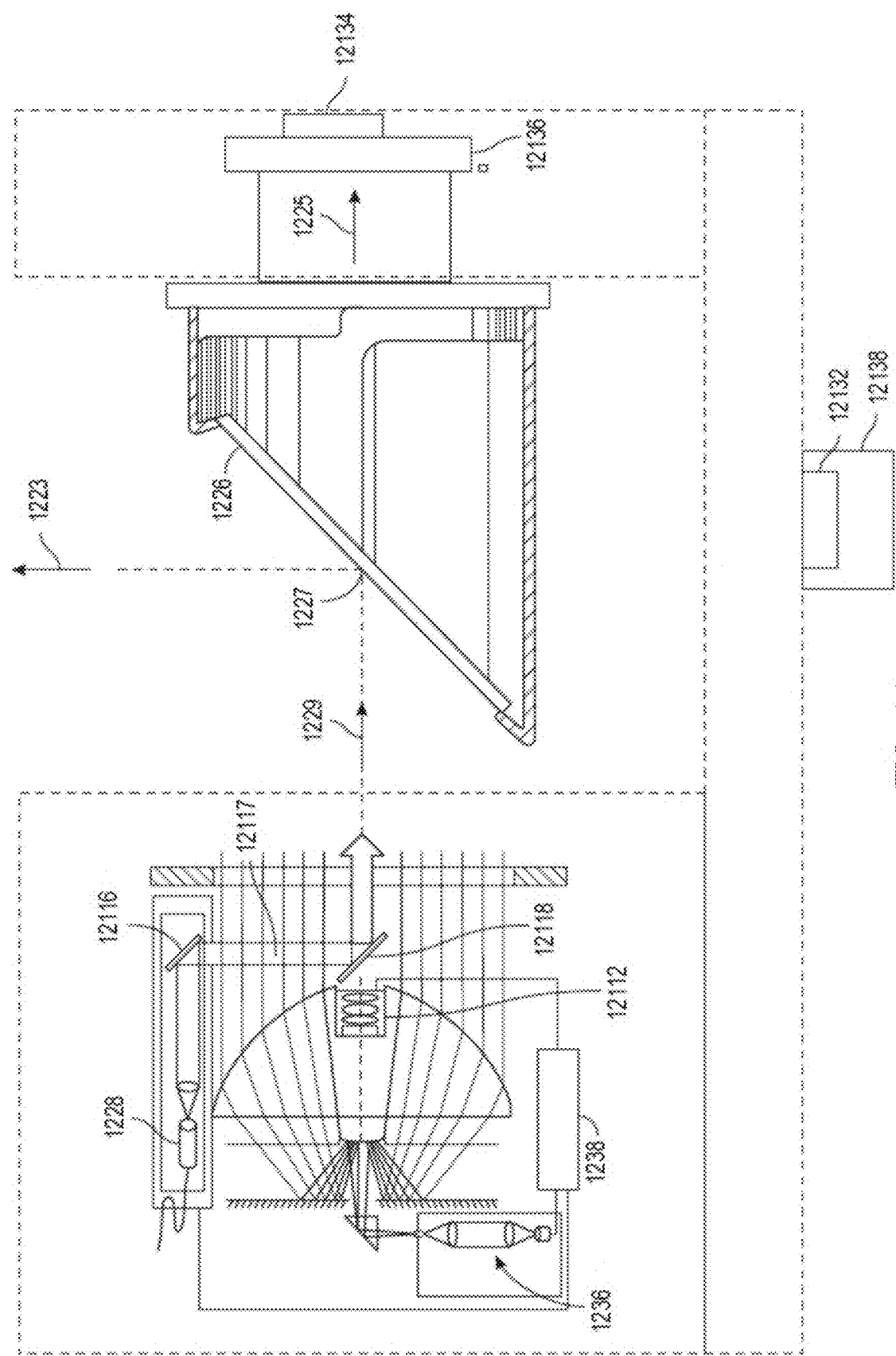
Figure 15:
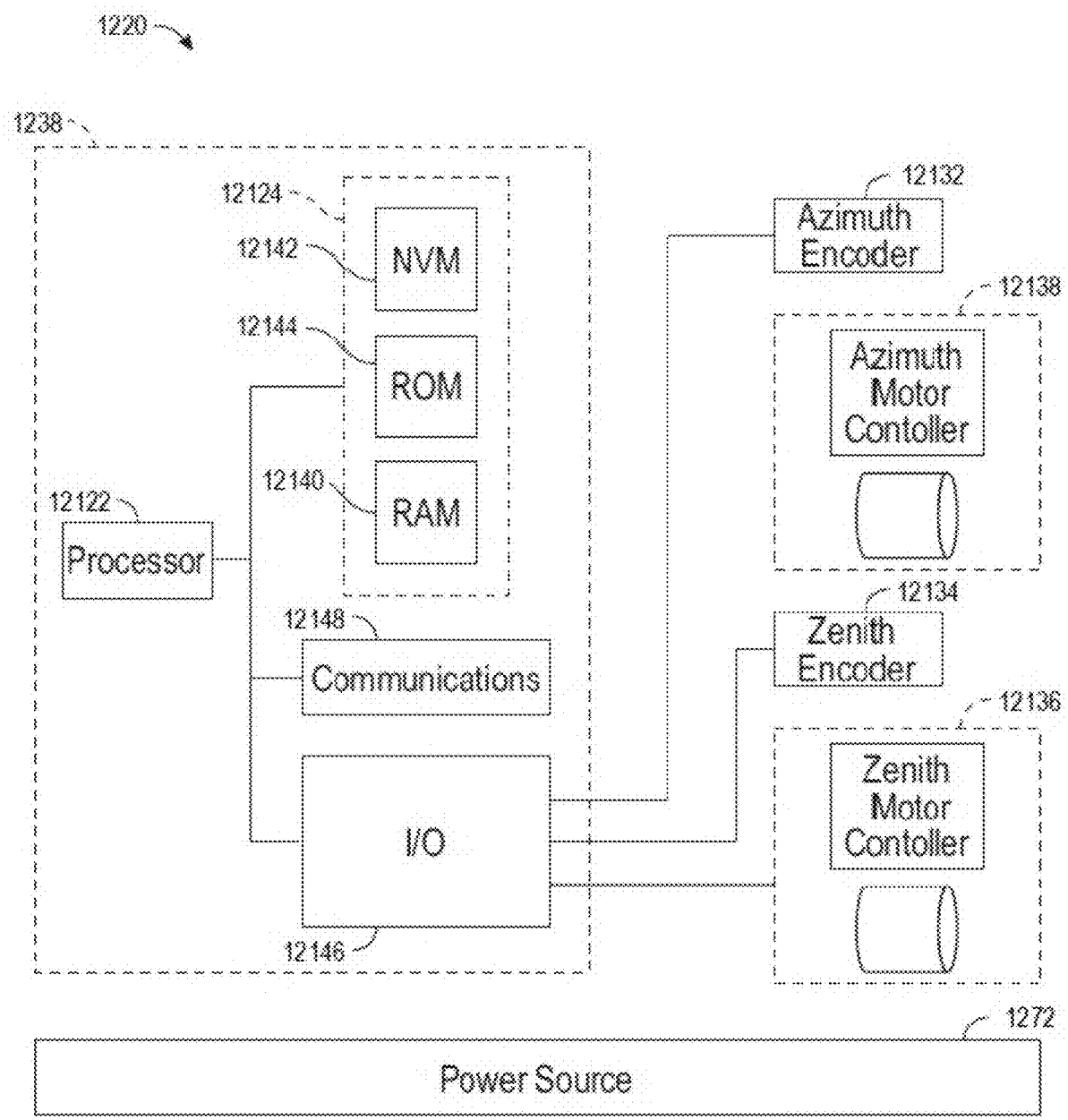

Referring now to FIG. 15 with continuing reference to FIGS. 12-14, elements are shown of the laser scanner 1220. Controller 1238 is a suitable electronic device capable of accepting data and instructions, executing the instructions to process the data, and presenting the results. The controller 1238 includes one or more processing elements 12122 (also referred to as "processors" or "processing devices"). The processors may be microprocessors, field programmable gate arrays (FPGAs), digital signal processors (DSPs), and generally any device capable of performing computing functions. The one or more processors 12122 have access to memory 12124 for storing information.

Controller 1238 is capable of converting the analog voltage or current level provided by light receiver 1236 into a digital signal to determine a distance from the laser scanner 1220 to an object in the environment. Controller 1238 uses the digital signals that act as input to various processes for controlling the laser scanner 1220. The digital signals represent one or more laser scanner 1220 data including but not limited to distance to an object, images of the environment, images acquired by panoramic camera 12126, angular/rotational measurements by a first or azimuth encoder 12132, and angular/rotational measurements by a second axis or zenith encoder 12134.

In general, controller 1238 accepts data from encoders 12132, 12134, light receiver 1236, light emitter 1228, and panoramic camera 12126 and is given certain instructions for the purpose of generating a 3D point cloud of a scanned environment. Controller 38 provides operating signals to the light emitter 1228, light receiver 1236, panoramic camera 12126, zenith motor 12136 and azimuth motor 12138. The controller 1238 compares the operational parameters to predetermined variances and if the predetermined variance is exceeded, generates a signal that alerts an operator to a condition. The data received by the controller 1238 may be displayed on a user interface coupled to controller 38. The user interface may be one or more LEDs (light-emitting diodes) 1282, an LCD (liquid-crystal diode) display, a CRT (cathode ray tube) display, a touch-screen display or the like. A keypad may also be coupled to the user interface for providing data input to controller 1238. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 1220.

The controller 1238 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(^) Protocol), RS-232, ModBus, and the like. Additional systems may also be connected to LAN with the controllers 38 in each of these systems being configured to send and receive data to and from remote computers and other systems. The LAN may be connected to the Internet. This connection allows controller 1238 to communicate with one or more remote computers connected to the Internet.

The processors 12122 are coupled to memory 12124. The memory 12124 may include random access memory (RAM) device 140, a non-volatile memory (NVM) device 12142, and a read-only memory (ROM) device 12144. In addition, the processors 12122 may be connected to one or more input/output (I/O) controllers 12146 and a communications circuit 148. In an embodiment, the communications circuit 1292 provides an interface that allows wireless or wired communication with one or more external devices or networks, such as the LAN discussed above.

Controller 1238 includes operation control methods embodied in computer instructions written to be executed by processors 12122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

It should be appreciated that the scanners 1000, 1220 shown in FIGS. 10-15 are for example purposes and the claims should not be so limited. In other embodiments, other types of coordinate measurement scanners may be used, such as but not limited to articulated arm coordinate measurement machines, laser line probes, line scanners, flying-dot scanners, structured-light scanners, laser trackers, total stations, theodolites, photogrammetry devices, or a combination of the foregoing. In an embodiment, the terrestrial scanners may be coupled to a mobile base, such as is described in commonly United States Patent Publication 2020/0250843, United States Patent Publication 2020/0355488, United States Patent Publication 2021/0055420, United States Patent Publication 2018/0321382, or U.S. Pat. No. 10,914,569, the contents of all of which are incorporated by reference herein. The terrestrial scanners may be moved manually (e.g. pushed by an operator), semi-autonomously (e.g. move along a preplanned path), or fully autonomously.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication." As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining, and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, digital CPU devices, GPU devices, computing devices, microcontrollers, digital signal processors (DSPs), field programmable gate arrays (FPGAs), or like devices, as further described herein. A CPU typically performs a variety of tasks while a GPU is optimized to display or process images and/or 3D datasets.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A method comprising:
   receiving, from a first three-dimensional scanner that acquires a first plurality of coordinate measurement points from at least one aerial position, the first plurality of coordinate measurement points capturing a portion of an environment and a reference object within the environment, the first plurality of coordinate measurement points defining at least a portion of a first point cloud, the reference object having a parallelepiped shape being a cuboid that comprises a first indicium on a side surface of the cuboid and a second indicium on a top surface of the cuboid;
   receiving, from a second three-dimensional scanner, a second plurality of coordinate measurement points from a position other than the at least one aerial position, the second plurality of coordinate measurement points capturing at least some of the portion of the environment and the reference object within the environment, the second plurality of coordinate measurement points defining at least a portion of a second point cloud; and
   aligning, by the processing device, the first point cloud and the second point cloud based at least in part on the reference object captured in the first point cloud and the reference object captured the second point cloud to generate a combined point cloud.

2. The method of claim 1, wherein the cuboid comprises an indicium on a surface of the parallelepiped shape.

3. The method of claim 1, wherein the reference object is inflatable.

4. The method of claim 1, wherein the reference object is foldable.

5. The method of claim 1, wherein the reference object comprises an indicium on a surface of the object.

6. The method of claim 5, wherein the indicium is reflective.

7. The method of claim 1, wherein the first image has a first time stamp associated therewith.

8. The method of claim 7, wherein the second point cloud has a second time stamp associated therewith.

9. The method of claim 1, wherein a surface of the reference object comprises a unique identifier.

10. The method of claim 1, wherein the reference object is two-dimensional.

11. The method of claim 1, wherein the reference object is three-dimensional.

12. A method comprising:
    defining multiple reference objects throughout an environment to be scanned, at least one of the multiple reference objects being inflatable;
    performing a first scan of the environment beginning at one of the multiple reference objects, the first scan comprising:
      capturing, along a first path, a first plurality of coordinate points of the environment including the multiple reference objects, the first plurality of coordinate points defining at least a portion of a first point cloud, and
      uploading the first point cloud to a cloud computing environment;
    performing a second scan of the environment, the second scan comprising:
      capturing, along a second path, a second plurality of coordinate points of the environment including the multiple reference objects, the second plurality of coordinate points forming at least a portion of a second point cloud; and
      uploading the second point cloud to the cloud computing environment; and
    aligning, at the cloud computing environment, the first point cloud and the second point cloud based at least in part on the multiple reference objects captured in the first point cloud and the multiple reference objects captured in the second point cloud to generate a combined point cloud.

13. The method of claim 12, wherein a surface of each of the multiple reference objects comprises a unique identifier that uniquely identifies an associated one of the multiple reference objects.

14. The method of claim 12, wherein each of the multiple reference objects has a defined geometry that is the same.

15. The method of claim 12, wherein at least one of the multiple reference objects is foldable.

16. A method comprising:

defining multiple reference objects throughout an environment to be scanned, at least one of multiple reference objects having a parallelepiped shape being a cuboid that comprises a first indicium on a side surface of the cuboid and a second indicium on a top surface of the cuboid, at least one of the multiple reference objects being foldable;

performing a first scan of the environment beginning at one of the multiple reference objects, the first scan comprising:

capturing, along a first path, first scan data of the environment including the multiple reference objects, and uploading the first scan data to a processing system;

performing a second scan of the environment, the second scan comprising:

capturing, along a second path, second scan data of the environment including the multiple reference objects, and uploading the second scan data to the processing system; and aligning, by the processing system, the first scan data and the second scan data based at least in part on the multiple reference objects captured in the first scan data and the multiple reference objects captured the second scan data to generate a combined dataset.

17. The method of claim 16, wherein the first scan is performed by a first scanner associated with a drone that follows the first path, and wherein the second scan is performed by a second scanner associated with a mobile base that follows the second path.

18. The method of claim 16, wherein the first scan is performed by an aerial scanner and wherein the second scan is performed by a terrestrial scanner.

* * * * *